Figure 1:
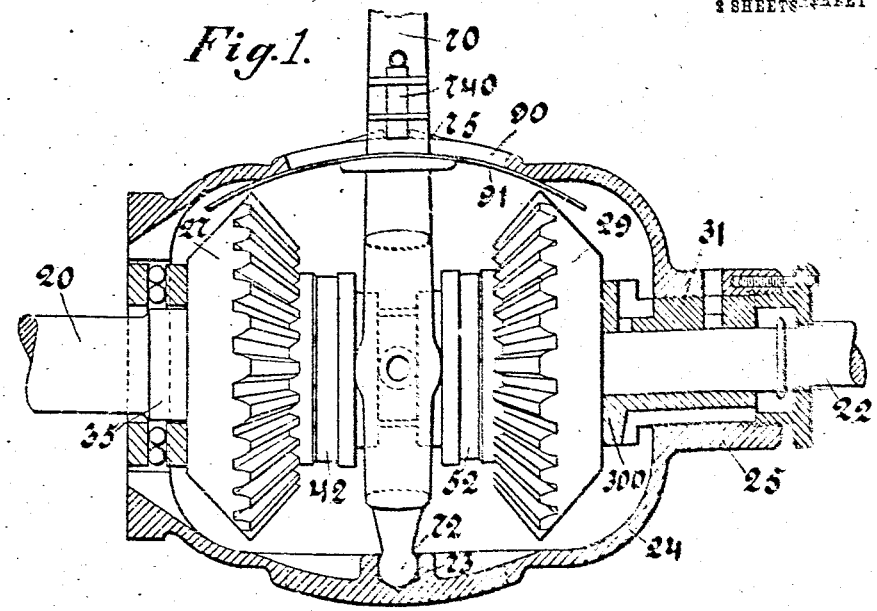

C. E. VAN AUKEN.
CLUTCH.
APPLICATION FILED MAR. 23, 1907.

907,541. Patented Dec. 22, 1908.

2 SHEETS—SHEET 1.

Witnesses:
F. H. Goldberger
H. D. Penney

Inventor:
Clarence E. Van Auken.
By his Attorney,
F. H. Richards.

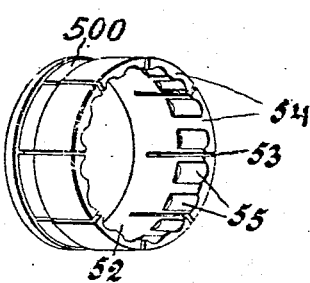
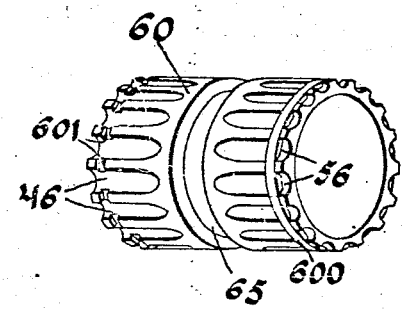
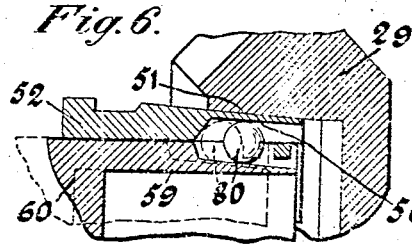
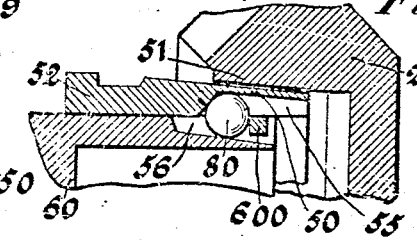
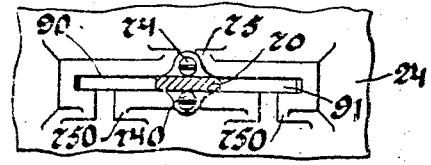
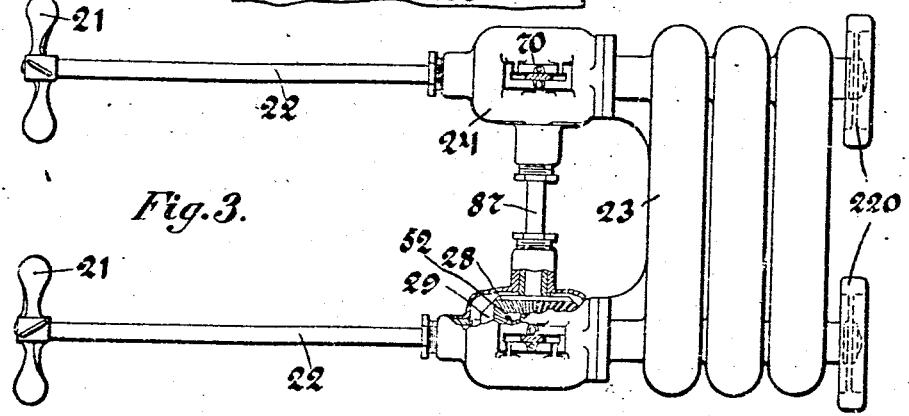

UNITED STATES PATENT OFFICE.

CLARENCE E. VAN AUKEN, OF YONKERS, NEW YORK, ASSIGNOR TO VAN AUKEN MOTOR AND MACHINE WORKS, OF YONKERS, NEW YORK, A CORPORATION OF NEW YORK.

CLUTCH.

No. 907,541.  Specification of Letters Patent.  Patented Dec. 22, 1908.

Application filed March 23, 1907. Serial No. 364,133.

*To all whom it may concern:*

Be it known that I, CLARENCE E. VAN AUKEN, a citizen of the United States, residing in Yonkers, in the county of Westchester and State of New York, have invented certain new and useful Improvements in Clutches, of which the following is a specification.

This invention relates to clutches, and has for an object to provide improved means for bringing the coöperative faces of a clutch into working engagement.

In certain situations in which clutch mechanisms are used, as for instance in coupling up the crank shaft of a motor to the propeller shaft of a boat, this device is particularly useful, since it is a well known fact that the longitudinal thrust upon the propeller shaft, when the boat is going forward, is toward the engine, and when the boat is going backward is away from the engine, and by taking advantage of this thrust for holding the parts in clutching engagement an efficient clutch mechanism is secured.

The clutch mechanism may embody reversing gears, and in which construction, when the device is used upon a propeller shaft, the longitudinal thrust not only toward the engine in the forward drive of the shaft may be taken advantage of for coöperation with the clutch, but the thrust of the shaft away from the engine and toward the propeller when using this for backing or when reversed may be employed for coöperation with the reversing clutch.

When used in connection with a propeller shaft, and more particularly with the shaft which is used upon a motor boat, the parts of the clutch will be so constructed that if the propeller strikes an obstruction, as for instance, hooks over a log or strikes a pier or wharf, gets tangled up in the cable chain, or some such mishap, which momentarily tends to stop or impede rotation of the propeller, the clutch will become disengaged owing to the cessation of the axial thrust of the shaft which has been effective in its coöperation with the parts of the clutch for holding these in clutching engagement. The controlling lever for the clutch members may be permitted to float when the parts are in operative or clutching position, and may have a catch for holding it in position for maintaining the parts in idle relation. This will permit the clutch, upon the propeller shaft being impeded by engagement with some obstruction, to throw the friction faces out of clutching engagement, and cause the lever which is floating to pass to the idle or unclutched position at which it will be locked. This will permit the engine to run free and the operator may then determine whether or not he desires to immediately throw the parts into clutching engagement and permit the propeller to rotate.

The parts of the clutch will be so constructed that upon throwing the lever or operating mechanism into position for bringing the clutch members into clutching engagement that the clutching engagement will only be partial. The crank shaft will be rotating and upon bringing the clutch members into engagement there will be a slight amount of friction produced sufficient to cause movement of the propeller shaft but not equal in speed to the rotation of the crank shaft, the clutch actuating lever will be held in this position and immediately upon the inauguration of the rotation of the propeller there will be a slight longitudinal thrust of the propeller shaft, which will augment the friction between the parts. Upon the operator then releasing the operating lever the continued rotation of the propeller and the longitudinal thrust upon the shaft will increase the friction of the parts until they rotate in unison and the propeller shaft is rotating in unison with the crank shaft. The continuation of this axial or longitudinal thrust will continue to hold the parts in their clutching relation until such a time as they are disengaged by the operation of the actuating devices or by the cessation of thrust of the propeller shaft.

The above mentioned features of the release of the clutch upon the cessation of the end thrust of the shaft in certain classes of boats may be resisted by a catch, as for instance where the boats are so constructed that at times the propellers are raised entirely out of the water; but the present illustration of this invention is particularly intended for the motor boat type of construction, in which the propellers are light and rarely get out of the water when the boat is running.

When the crank shaft is stopped, the thrust, of course, will cease and the clutch will become disengaged automatically, the operating lever will assume its normal or idle position at which it will be locked automatically, so that upon the starting up of the engine there will be no load from the driven shaft upon the motor. And when an internal combustion engine is used for driving the shaft which is to be connected up by means of the clutch mechanism this will be found advantageous for it might happen that the engine would be turned over and started, the driven shaft connected up with it and then for some reason the engine would stop. Ordinarily this would require that the operator throw the clutches out of engagement, but in this form of clutch when the engine is stopped, owing to incomplete firing, coldness of the cylinders or some cause, the load will automatically be thrown off of the engine, and the operator will have no difficulty in turning his engines over for the purpose of starting them.

The construction illustrated embodies a fixed friction face and some coöperative friction faces which are capable of being sprung outwardly and into engagement with the fixed friction face, the outward movement of which latter friction face is effected by means of coöperative inclined planes with balls located between them. These coöperative inclined planes constitute ball races, as it were, disposed in a direction longitudinally of the shaft, that is, the axis of the ball races will be disposed in a plane which coincides with the axis of rotation of the parts which are to be coupled. By this means it will be seen that the torque of the shaft has no influence upon the tightening of the clutch members, this is effected only by the longitudinal thrust. The balls are situated between the parts of the device which move longitudinally incident to the operation of the clutches and to the thrust of the shaft, and will not only act as anti-friction bearings between the parts, which so move longitudinally, but also will act as anti-friction bearings for the friction which would otherwise be produced by the torque of the shaft, when this has duty upon it, and the shaft is moved longitudinally for disengaging the clutch members.

When my improvement is employed in connection with a propeller shaft and it is desired to bring the parts into clutching relation one of these, the propeller in the present illustration, will be given a sliding movement in the direction which it will tend to move incident to its axial thrust while under duty. When it is desired to uncouple or place the clutch members in inoperative relation the part will be moved in the opposite direction, in the present illustration against its axial thrust.

The drawings accompanying and forming a part of this specification show a practicable embodiment of a form of my invention, in which—

Figure 2:
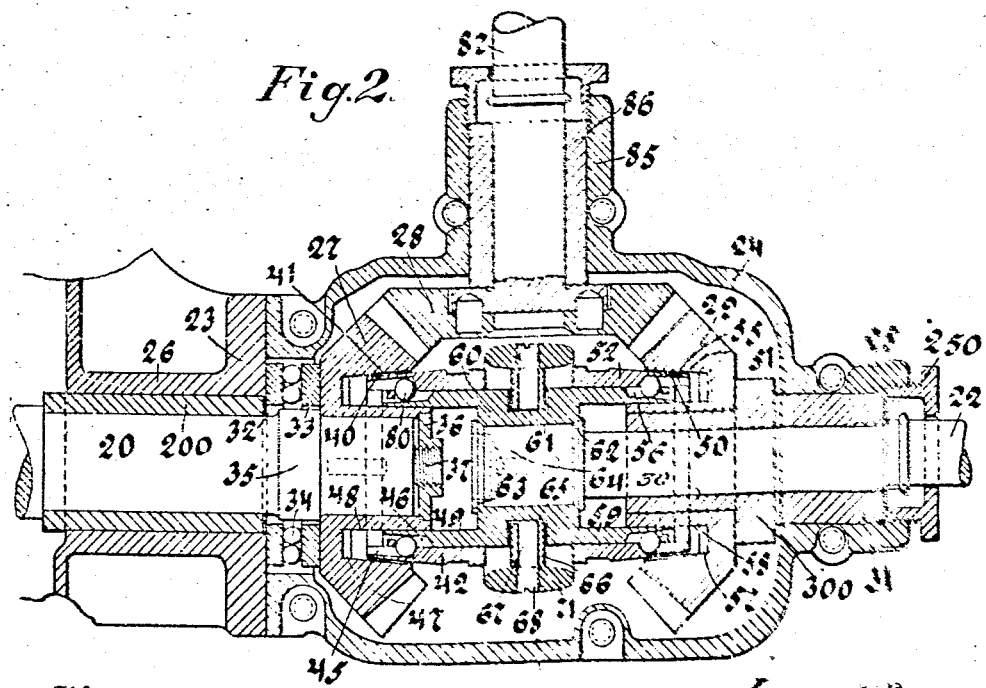

Figure 1 is a side view of the mechanism with the gear casing or housing shown in longitudinal section. Fig. 2 is a longitudinal section on a horizontal plane of the mechanism illustrated in Fig. 1. Fig. 3 is a plan view of a motor boat engine and twin propellers equipped with my present improvement. Fig. 4 is a perspective view of the clutch member carried by the driven shaft. Fig. 5 is a perspective view of the part for expanding the clutch member. Fig. 6 shows a large detail in longitudinal section of the clutch expander and the ball in closed position. Fig. 7 illustrates similar parts in an open position; and Fig. 8 is a top plan view of the parts connected with the clutch lever detents.

The crank shaft is designated by 20, and in Fig. 3 two of these crank shafts are shown for driving twin propellers 21 mounted upon propeller shafts 22. The engine casing is designated in a general way by 23. This, of course, forms no part of the present improvement and is illustrated for showing the relationship between parts of the invention and those parts which the clutch is particularly adapted to connect, namely an internal combustion engine and propellers, that is, the propeller shafts of twin propellers with the crank shafts of the internal combustion engine having opposed pistons working upon a pair of crank shafts. The views of the clutch mechanism parts are shown incased in a housing, designated in a general way by 24, and which is shown as of strong enough construction to constitute not only the gear casing but a bearing portion 25 for the propeller shaft. The crank shaft is shown as having a bearing 26 from the main frame of the engine.

Although one of the clutch units has been described in detail yet for the purpose of showing its adaptability a pair of these units applied to the clutch and reversing mechanism of a propeller shaft will be described.

The crank shaft has fast upon it a miter gear 27 meshing with an idler miter gear 28 which meshes with a miter gear 29 loose upon a sleeve 31, which is loose upon the propeller shaft 22, and is interposed between the bearing 25 and such shaft 22 and has an extension 30 between the miter gear 29 and the shaft. A collar 300 is on this sleeve and affords a thrust bearing between the miter gear 29 and the bearing 25, when the propeller is reversed. The thrust bearing for receiving the driving thrust when the propeller is running forwardly is shown as comprising a pair of plates 32, 33 between which balls 34 are mounted. It is found unnecessary to afford an anti-friction bearing for taking up the thrust when the propeller is reversed, since it is only for short periods of time and at rather long intervals that the propeller is reversed, and at such times as it is reversed high speed is not generally attained.

The miter gear 27 is held between a shoulder 35 on the crank shaft and a plate 36 which is held in position by means of a screw 37. Each of the gear wheels 27 and 29 has a chamber within it, one wall of which will constitute the fixed friction member of the friction clutch, and in the present construction the wall which is outwardly disposed, that is the one which is furthest from the axis and faces toward the axis, will be the friction face. These are designated 41 and 51 respectively and are shown at an angle to the axis of the shaft and to the axis of the wheel which carries it. These faces will coöperate with faces 40—50 respectively carried by members 42—52 which are free to move relative to the propeller shaft and to move longitudinally with the propeller shaft relative to the crank shaft. That one of the members 40—52 which is in the active complement of parts in the clutch which is being coupled or uncoupled will have a certain amount of axial movement independently of the movement of the member 60. In coupling, taking the member 52 for example, when the member 60 is moved toward the right in Fig. 7 the member 52 will move with it relatively to the member 29 until the friction face 52 engages the friction face 29 and then this movement of the member 52 will be arrested relative to 29 and the member 60 will move relatively to the members 52 and 29. To a certain degree there is a floating shaft and a member of the friction clutch, 52, floatingly mounted upon this shaft.

A member 60 is shown axially movable relative to the member 42—52. A portion 61 of the member 60 engages shoulders 62—63 upon a head 64 of the propeller shaft 22 and to which head the member 60 is shown keyed. The propeller shaft 22 will "float" in its bearings. The member 60 has a circumferential groove 65 in which are mounted shoes 66, each of which is carried by a pivot end 67 of a screw 68 which is screwed into a portion of the actuator lever 70. This portion is in the present instance a ring 71. The fulcrum of the lever is shown as a ball 72 seating in a socket 73 in the gear case. The lever carries a spring actuated catch 74 coöperating with a detent 75 upon the gear casing. The position of the detent 75 is shown as in the center of the path of movement of the lever and so situated that it will lock the lever in a position in which it will hold both of the friction clutches idle. In some situations it is found highly desirable to have the lever floating; except when it is in a position to hold both of the clutches idle. At other times a catch 74a and detents 75a may be employed for holding the parts in clutching engagement irrespective of the thrust of the parts coupled. The members 42—52 are split as at 43—53, making a number of fingers 44—54, each of which fingers in the present instance is shown as carrying portions of two of the ball races 45—55, and each end of the member 60 is shown as carrying other portions 46—56 of the races.

In Fig. 5 it will be seen that there is a circumferential groove 500 around the perimeter of the member 52. This is for the purpose of reducing the stiffness of the metal at the ends of the fingers 54 where these are separated or spaced off by the splits 53. The fact that the rings 42—52 are split in a number of places is of advantage in providing proper raceways for the balls, since if the rings were split at but one or two places, upon the expansion and contraction of the ring the halves of each of the respective longitudinal races would be shifted out of position and the balls would be caused to bind.

The axes of these races are disposed at an angle to the axis of rotation of the various parts of the clutch and each will occupy a plane which will also embrace the said axis of rotation. The angle which I have found to be rather forceful in practice for these races is an angle of about two degrees. A greater angle will act more rapidly, that is, the clutching friction may be arrived at more readily, but the power to hold is reduced by the greater angle. In many situations, as for instance in motor boats, it is found desirable to have the frictional engagement somewhat retarded in arriving at its full state of efficiency and then when such state of efficiency is arrived at to have the frictional engagement of the strongest possible character.

When the crank shaft is running and the parts are in the position illustrated in Fig. 2 the gear wheel 27 will be rotating by virtue of the fact that it is fast with the crank shaft, it will be rotating the idler 28 which will rotate the gear wheel 29 causing this to idly move about the sleeve 30. Upon moving the member 60 toward the engine, namely, toward the left in such figure, the balls, designated without preference by 80, will be forced in the same direction and running up the inclined plane of the bottom of the races 46 will engage the inclined planes of the bottoms of the races 45 and will spring the fingers 44 outward and into position and bring the face 41 into engagement with the face 40.

It will here be remembered that the member 60 is fast with the propeller shaft both as to the axial and angular movements thereof, and that the part 42 is independent, to a certain degree, of the axial movement of the propeller shaft. Upon the faces 40 and 41 being forced together friction will be established between these, and the propeller will commence to rotate and to thrust the shaft longitudinally toward the engine or toward the left. The movement of the lever toward the left draws the propeller shaft in this direction, the direction which it normally tends to thrust, and as the propeller continues its rotation the thrust will continue until the part 60 is driven up into the part 42 to bring the balls further up upon the inclined planes represented by the bottoms of the races 45 and 46 and a tight fit will be had.

It will be seen that the faces 40 and 50 are at an angle to their axes and the faces 41 and 51 are also at an angle. This is for permitting the frictional engagement to be effected and discontinued upon a slighter longitudinal movement of the parts relative to each other than would be the case with an equal amount of clearance and the friction faces made cylindrical. The angular relation between these faces also will compensate for wear and the life of the clutch will be increased. At 47—57 the faces 41—51 are shown as substantially cylindrical as are also the inside faces 48—58, which faces 48—58 engage the faces 49—59 of the member 60.

Upon the cessation of the thrust of the propeller shaft, whether this be effected by the propeller shaft encountering an obstruction or by the crank shaft ceasing to rotate, the spring action of the fingers 44 and the position of the balls in the races 45—46 will cause the fingers to snap or spring backwardly and move the propeller in a reverse direction to that which it has been thrusting in its work, and release the frictional relation between the clutch members. The member 42 will not only cause the backward movement of the propeller shaft but will also incident to the action of the balls upon its spring fingers move out of the member 29 to a slight extent. Of course the parts may be disengaged by actuating the operating lever and positively drawing the friction faces from engagement with each other. It may here be stated that the tendency of the friction face 40 to contract will assist the drawing apart of the friction faces.

When it is desired to reverse the shaft or cause it to rotate in a reverse or backward direction it will be necessary to swing the operating lever, in the present illustration toward the right and move the propeller shaft 22 away from the engine, or in the direction it will normally tend to thrust when running reversely and in which case the friction faces 50 and 51 will be brought into clutching relation. This will then permit the train of gears 27, 28 and 29 to become effective for rotating the shaft 22 reversely to the rotation of the crank shaft. Since the operation of the various parts of the clutch mechanism for this side or end are similar to those previously described for effecting the normal or forward rotation of the propeller shaft it is deemed unnecessary to describe them in detail.

The gear casing 24 is shown as carrying a bearing support 85 which carries a bearing bushing 86 for supporting the shaft 87 which will be fast with the idler 28 in the trains of gears between the twin shafts. This construction is used in connection with the two crank shafts which will be driven by means of opposed pistons working together in the engine casing after a manner described in my application for United States Letters Patent filed March 17, 1907, Serial No. 362,260.

The body portions of the members 42 and 52 are sufficiently rigid to give a rather stiff spring action to the fingers 44—54 when these are forced out of their normal position by means of the balls 80 running up inclined planes represented by the races 45—55 in conjunction with the expander member. Upon the release of the pressure which holds the expander member in its position which causes the outward expansion of the fingers this spring action is sufficiently strong to cause the parts to assume their normal or inactive position. For the purpose of preventing the balls 80 being sprung out of the raceways a suitable guard may be provided. In the present illustration this is shown as comprising a spring ring 600 located in notches 601 which constitute a circumferential groove about the ends of the member 60.

The gear casing will in many instances be in positions where it will be exposed to dust and dirt, and in the situation illustrated in Fig. 3 will be exposed at times to water. The lever 70 operates through a slot 90 in the gear casing and will carry a spring closure plate 91 for closing this slot. This will also confine the oil bath for the movable parts.

A gland or adjusting member 250 is screwed into the bearing 25 for adjusting the position of the collar 300 and thereby compensating for wear and backlash of the gearing. The parts of the engine inclosed within the casing 23 are not illustrated other than to show the crank shaft 20. This crank shaft in Fig. 2 is shown as mounted in a sleeve or bushing 200 and in Fig. 3 balance or fly wheels 220 are shown mounted upon these shafts.

Having described my invention I claim:

1. The combination with a rotary driver having a friction clutch face concentric to its axis of rotation, of a driven member in axial alinement with said driver and axially movable toward and from the same, a work performing member driven by said driven member tending in its axial working thrust to move the same toward the said friction clutch face, an expansible member having a coöperative friction clutch face carried by said shaft and axially movable thereon, means fast with the shaft for expanding said member and effective upon movement in the direction of the working thrust of the shaft, and means for axially moving the said shaft.

2. The combination with a rotary driver having a friction clutch face concentric with its axis of rotation, of an axially shiftable driven member, a member rotatable with said driven member and in axial alinement with said driver for engaging said friction clutch face and comprising a number of spring fingers each provided upon one side with a friction face and upon the other side with an actuator engaging face, and an actuator fast with said driven member for engaging said faces and expanding said fingers.

3. The combination with a driver provided with a friction clutch face constituting the walls of a chamber, of a driven member axially shiftable relative to the driver, an elastically yieldable member movable axially on said driven member and provided upon its outer surface with friction faces for engaging those in said chamber, said member being provided with bearing faces upon its inner surface, a member carried by the driven member and provided with faces for engaging said actuator faces and expanding said movable member, and means for shifting said driven member for effecting such expansion.

4. The combination with a member provided with an internal friction face, of a member comprising a plurality of spring fingers each having upon its outer side a friction face and upon its inner side a longitudinally disposed portion of a ball race, and actuator for said fingers having mating portions of ball races, and balls in said races for springing said fingers outwardly.

5. The combination with a driver, having a friction clutch face, and a floating shaft, of an expansible member floating on said shaft and having a coöperative friction clutch face, a member fast with said shaft for expanding said floating member into engagement with the friction clutch face upon the driver, and means for moving the shaft longitudinally for effecting the initial expansion of said member.

6. The combination with a driver provided with a chamber the outer walls of which constitute a friction clutch face, of a driven shaft, a member movable axially thereon and provided with elastically yieldable friction faces for engaging those in said chamber, said member being provided with ball races disposed in angular relation to the axis of the said member, a member carried fast with the shaft and provided with mating angularly disposed ball races, balls in said races, and means for shifting the shaft for effecting the expansion of said elastically movable member.

7. The combination with a rotary driver having a friction clutch face concentric to its axis of rotation, of a driven shaft in axial alinement with said driver and axially movable toward and from the same, a work performing member on said driven member tending in its axial working thrust to move the same toward the said friction clutch face, a member having a coöperative friction clutch face carried by said shaft and axially movable thereon, means fast with the shaft for effecting the clutching engagement of said coöperative faces upon movement of the shaft in the direction of its working thrust and for moving the shaft in a direction opposite its working thrust upon discontinuance of said thrust.

8. The combination with a rotary driver having a friction clutch face concentric to its axis of rotation, of a driven shaft in axial alinement with said driver and axially movable toward and from the same, a work performing member on said driven member tending in its axial working thrust to move the same toward the said friction clutch face, an expansible member having a coöperative friction clutch face carried by said shaft and axially movable thereon, means fast with the shaft for expanding said member and effective upon movement in the direction of the working thrust of the shaft and automatically effective for moving the shaft in a direction opposite its working thrust upon discontinuance of said thrust, and manually controlled means for axially moving the said shaft.

Signed at Nos. 9-15 Murray st., New York, N. Y., this 20th day of March, 1907.

CLARENCE E. VAN AUKEN.

Witnesses:
CHAS. LYON RUSSELL,
F. E. BOYCE.